United States Patent
Kim et al.

(10) Patent No.: US 8,941,861 B2
(45) Date of Patent: Jan. 27, 2015

(54) IMAGE FORMING SYSTEM HAVING AN IMAGE FORMING APPARATUS AND A HOST AND A METHOD OF MANAGING THE SAME

(75) Inventors: Young-ju Kim, Suwon-si (KR); Sang-hyup Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1258 days.

(21) Appl. No.: 12/491,493

(22) Filed: Jun. 25, 2009

(65) Prior Publication Data

US 2010/0002253 A1  Jan. 7, 2010

(30) Foreign Application Priority Data

Jul. 1, 2008 (KR) .................. 10-2008-0063642

(51) Int. Cl.
*G06F 3/12* (2006.01)
*G06F 9/44* (2006.01)
*G06F 9/46* (2006.01)

(52) U.S. Cl.
CPC ............ *G06F 3/1204* (2013.01); *G06F 3/1225* (2013.01); *G06F 3/123* (2013.01); *G06F 3/1287* (2013.01); *G06F 3/1288* (2013.01)
USPC ............................. 358/1.15; 717/168; 719/321

(58) Field of Classification Search
None
See application file for complete search history.

(56) References Cited

U.S. PATENT DOCUMENTS

| | | | |
|---|---|---|---|
| 7,756,955 B2 | 7/2010 | Takagi | |
| 8,161,198 B2 | 4/2012 | Kikuchi | |
| 8,402,477 B2 | 3/2013 | Machida | |
| 2004/0133890 A1* | 7/2004 | Fukuda | 718/100 |
| 2004/0158817 A1* | 8/2004 | Okachi et al. | 717/122 |
| 2005/0200880 A1* | 9/2005 | Oshiumi et al. | 358/1.14 |
| 2007/0101345 A1* | 5/2007 | Takagi | 719/321 |
| 2008/0137136 A1* | 6/2008 | Shin | 358/1.15 |

FOREIGN PATENT DOCUMENTS

| | | |
|---|---|---|
| JP | 2005092895 | 4/2005 |
| JP | 2006031556 | 2/2006 |
| JP | 2007-122376 | 5/2007 |
| JP | 2007128260 | 5/2007 |
| KR | 20030052008 | 6/2003 |

OTHER PUBLICATIONS

Korean Office Action dated Aug. 26, 2013 issued in KR Application No. 10-2008-0063642.

(Continued)

*Primary Examiner* — Vincent Rudolph
(74) *Attorney, Agent, or Firm* — Staas & Halsey LLP

(57) ABSTRACT

An image forming apparatus, a host client, an image forming system and a managing method thereof are provided. The managing method of an image forming system which includes an image forming apparatus, and a host client which is connected to the image forming apparatus, includes determining whether a predetermined event of the image forming apparatus happens or not, informing at least one host client whether to perform an uninstalling of a printer driver which corresponds to the image forming apparatus or not if the predetermined event happens, selecting the uninstalling of the printer driver depending on the informing, and deleting the printer driver of the host client depending on the selecting. Thus, the present general inventive concept provides an image forming apparatus, a host client, an image forming system and a managing method thereof efficiently managing a control program corresponding to the image forming apparatus.

13 Claims, 12 Drawing Sheets

(56) References Cited

OTHER PUBLICATIONS

Korean Office Action dated Aug. 26, 2013 issued in KR Application No. 10-2013-0095994.

Korean Office Action dated Feb. 14, 2013 issued in KR Application No. 10-2008-0063642.

Notice of Allowance issued in Korean Application No. 10-2013-0095994 on Feb. 5, 2014.

* cited by examiner

FIG. 5

INFORMING TARGET COMPUTER LIST

| COMPUTER NAME | DRIVER INSTALL | DRIVER UNINSTALL | DRIVER UPGRADE | FIRMWARE UPGRADE |
|---|---|---|---|---|
| A | YES ☑ NO ☐ | YES ☑ NO ☐ | YES ☐ NO ☑ | YES ☐ NO ☑ |
| B | YES ☑ NO ☐ | YES ☐ NO ☑ | YES ☑ NO ☐ | YES ☑ NO ☐ |
| C | YES ☐ NO ☑ | YES ☑ NO ☐ | YES ☐ NO ☑ | YES ☐ NO ☑ |
| D | YES ☐ NO ☑ | YES ☐ NO ☑ | YES ☑ NO ☐ | YES ☑ NO ☐ |
| E | YES ☐ NO ☑ | YES ☑ NO ☐ | YES ☐ NO ☑ | YES ☑ NO ☐ |
| ... | ... | ... | ... | ... |

OK    CANCEL

PRINTER DRIVER AUTOMATIC CHANGE LIST

| COMPUTER NAME | DRIVER INSTALL | DRIVER UNINSTALL | DRIVER UPGRADE |
|---|---|---|---|
| A | YES ☑ NO ☐ | YES ☐ NO ☑ | YES ☐ NO ☑ |
| B | YES ☑ NO ☐ | YES ☐ NO ☑ | YES ☐ NO ☑ |
| C | YES ☐ NO ☑ | YES ☑ NO ☐ | YES ☐ NO ☑ |
| D | YES ☐ NO ☑ | YES ☑ NO ☐ | YES ☐ NO ☑ |
| E | YES ☐ NO ☑ | YES ☐ NO ☑ | YES ☑ NO ☐ |
| ... | ... | ... | ... |

OK  CANCEL

400

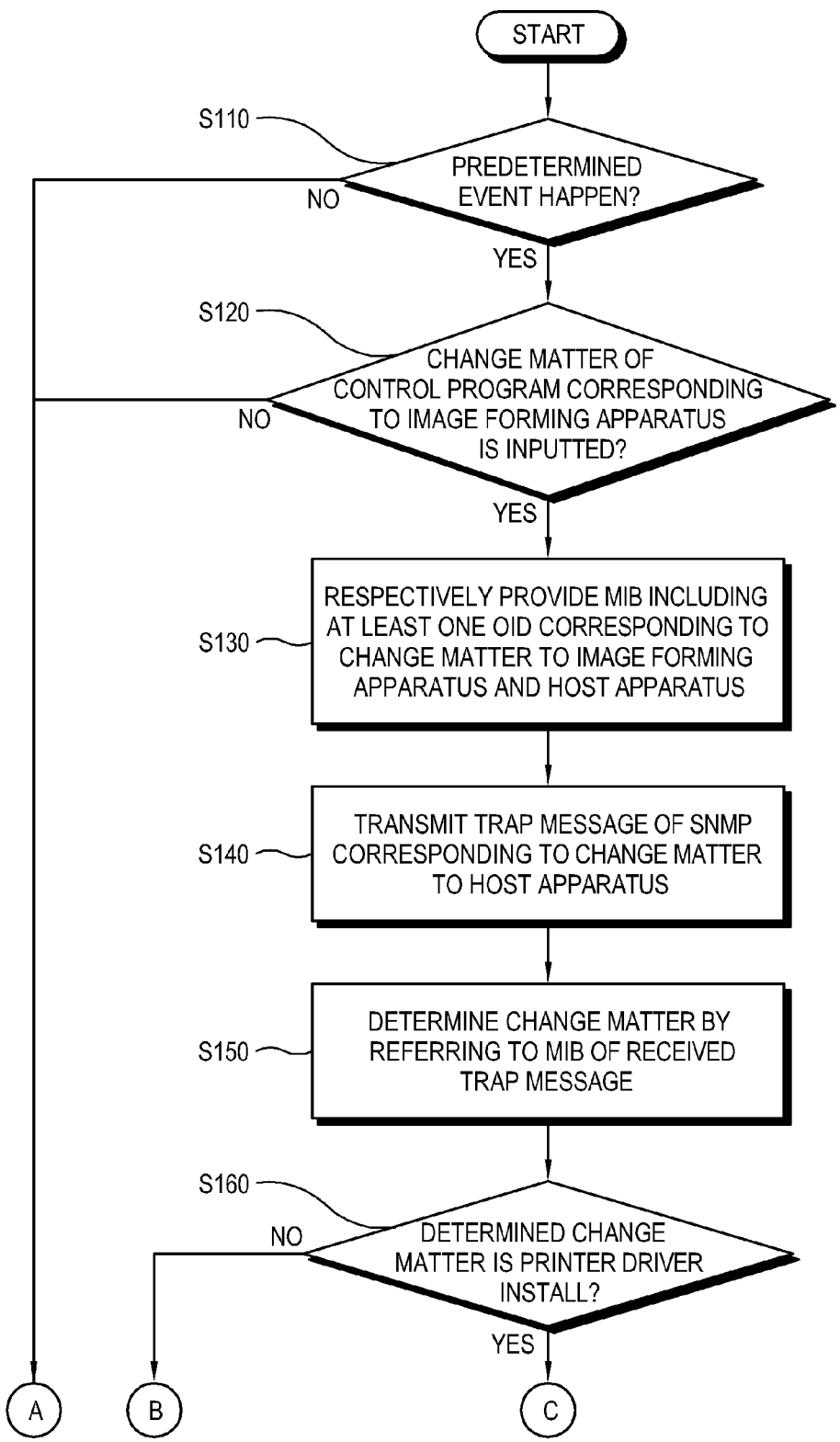

IMAGE FORMING SYSTEM HAVING AN IMAGE FORMING APPARATUS AND A HOST AND A METHOD OF MANAGING THE SAME

CROSS-REFERENCE TO RELATED APPLICATIONS

This application claims priority under 35 U.S.C. §119(a) from Korean Patent Application No. 10-2008-0063642, filed on Jul. 1, 2008 in the Korean Intellectual Property Office, the disclosure of which is incorporated herein by reference in its entirety.

BACKGROUND OF THE INVENTION

1. Field of the Invention

The present general inventive concept relates to an image forming apparatus, a managing server of the image forming apparatus, a host client and a managing method of an image forming system, and more particularly, to an image forming apparatus, a managing server of the image forming apparatus, a host client and a managing method of an image forming system efficiently managing a control program of the image forming apparatus.

2. Description of the Related Art

An image forming apparatus is connected to a host client, such as a computer, to print image data. The image data is printed on a printing medium by the computer by using an application program installed in the computer. The image forming apparatus includes a multifunction device, a laser printer, an ink jet printer, a scanner, etc.

Also, the host client is installed with a printer driver to change the image data into a printing data which is capable of being understood by the image forming apparatus, and a firmware for removing an internal hardware is stored in a non volatile memory such as a read only memory (ROM) in the image forming apparatus.

Compared to a general printer connected to a specific host client through a USB (Universal Serial Bus) or a parallel port, it is easy to change an installation place of a network printer mounted with a network interface card, since a general network printer has a static internet protocol (IP) address and is directly connected to a network. The network printer is capable of processing a lot of printing works demanded from a plurality of host clients on the network.

However, if an installation place of the image forming apparatus such as the network printer is changed, and a gateway or an IP address is changed, it may be impossible to process a printing work by means of a printer driver of the network printer installed in an existing host client. Since an unnecessary printer driver is not being used in the host client, this causes a resource waste of the host client, and drivers are inefficiently managed.

Also, if it is necessary to install a printer driver in the host client and to upgrade a printer driver previously installed, since it is unreasonable that a user of each host client to recognize this, it is necessary to inform the user of the above. Also, it is the same if it is necessary to install, uninstall or upgrade a control program for controlling the network printer such as a firmware besides the printer driver.

SUMMARY OF THE INVENTION

The present general inventive concept provides an image forming apparatus, a host client, an image forming system and a managing method thereof efficiently managing a control program corresponding to the image forming apparatus.

The present general inventive concept also provides an image forming apparatus, a managing server of the image forming apparatus, a host client and a managing method of an image forming system informing a user of the host client of a change of a control program of the image forming apparatus.

The present general inventive concept provides an image forming apparatus, a managing server of the image forming apparatus, a host client and a managing method of an image forming system improving a user convenience.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a managing method of an image forming system which comprises an image forming apparatus, and a host client which is connected to the image forming apparatus, the managing method of the image forming system including determining whether a predetermined event of the image forming apparatus happens, informing at least one host client whether to perform an uninstalling of a printer driver which corresponds to the image forming apparatus if the predetermined event happens, selecting the uninstalling of the printer driver depending on the informing, and deleting the printer driver from the host client depending on the selecting.

The predetermined event may be stored in a memory of the image forming apparatus.

The informing may comprise questioning to a user whether to delete the printer driver from the host client.

The managing method of the image forming apparatus further comprise inputting directly an uninstalling command of the printer driver to the image forming apparatus, wherein the informing comprises informing at least one host client whether to uninstall the printer driver depending on the inputting.

The deleting the printer driver may comprise using an uninstall parameter to execute a deleting program of the printer driver which is previously installed.

The canceling of the uninstalling of the printer driver may be allowed to be selected to correspond to a result of the informing.

The informing may comprise transmitting the uninstalling command of the printer driver to the host client according to a trap message format of a simple network management protocol (SNMP).

The informing may be performed by means of at least one of displaying and voice outputting to the host client.

The event may be displayed in the image forming apparatus if the predetermined event happens.

The foregoing and/or other aspects and utilities of the present general inventive concept may also be achieved by providing a managing method of an image forming system that includes an image forming apparatus, and at least one host client which is connected to the image forming apparatus, the managing method of the image forming system including determining whether a predetermined event of the image forming apparatus happens, transmitting an uninstalling command of a printer driver which corresponds to the image forming apparatus to at least one host client if the predetermined event happens, and deleting the printer driver from at least one host client.

The foregoing and/or other aspects and utilities of the present general inventive concept may also be achieved by providing an image forming apparatus, including a communicating unit to communicate with at least one host client, an image forming unit to form an image on a printing medium, and a control unit to control the communicating unit to inform at least one host client of an uninstalling performing command of a printer driver which corresponds to the image forming unit if a predetermined event of the image forming apparatus happens.

The predetermined event may be stored in a memory of the image forming apparatus.

The image forming apparatus further comprise an input and configuration unit to directly input the uninstalling performing command of the printer driver, wherein the control unit informs the host client whether to uninstall the printer driver depending on an input result of the input and configuration unit input and configuration unit.

The control unit further comprises a message generating unit to generate the command according to a trap message format of a simple network management protocol (SNMP).

The foregoing and/or other aspects and utilities of the present general inventive concept may also be achieved by providing a host client, including a host communicating unit to communicate with an image forming apparatus, an informing unit, an input and configuration unit, and a host control unit to control the communicating unit to inform whether to perform an uninstalling of a printer driver which corresponds to the image forming apparatus if an uninstalling command of the printer driver is received through the host communicating unit, and to perform or cancel the uninstalling of the printer driver depending on an input result inputted through the input and configuration unit to correspond to the informing result.

The informing unit may comprise at least one of a display unit which visually displays and a voice outputting unit to audibly output whether to perform the uninstalling of the printer driver.

The host control unit may delete the printer driver from the host client by using an uninstall parameter to execute a deleting program of the printer driver which is previously installed.

The foregoing and/or other aspects and utilities of the present general inventive concept may be achieved by providing an image forming system, including an image forming apparatus, at least one host client which is connected with the image forming apparatus to print through the image forming apparatus, and a managing server to inform at least one host client whether to perform an uninstalling of a printer driver which corresponds to the image forming apparatus if a predetermined event of the image forming apparatus happens, the printer driver being deleted from the host client depending on selection of the host client.

The foregoing and/or other aspects and utilities of the present general inventive concept may also be achieved by providing a method of managing an image forming system including an image forming unit and at least one host client communicatively connected to one another, the method including informing the at least one host client when a predetermined event has occurred with the image forming unit, receiving an instruction from the at least one host client to perform an uninstalling of the printer driver corresponding to the image forming unit based on the informing, and deleting the printer driver according to the received instruction from the host client.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which:

FIG. 5 illustrates an example of a user interface (UI) of an informing target computer list displayed in the managing server of the image forming apparatus in FIG. 4;

FIG. 6 illustrates an example of a UI of a printer driver automatic change displayed in the managing server of the image forming apparatus in FIG. 4;

FIGS. 8A and 8B are flowcharts illustrating a managing method of an image forming system according to a second exemplary embodiment of the present general inventive concept;

DETAILED DESCRIPTION OF THE PREFERRED EMBODIMENTS

Figure 1:
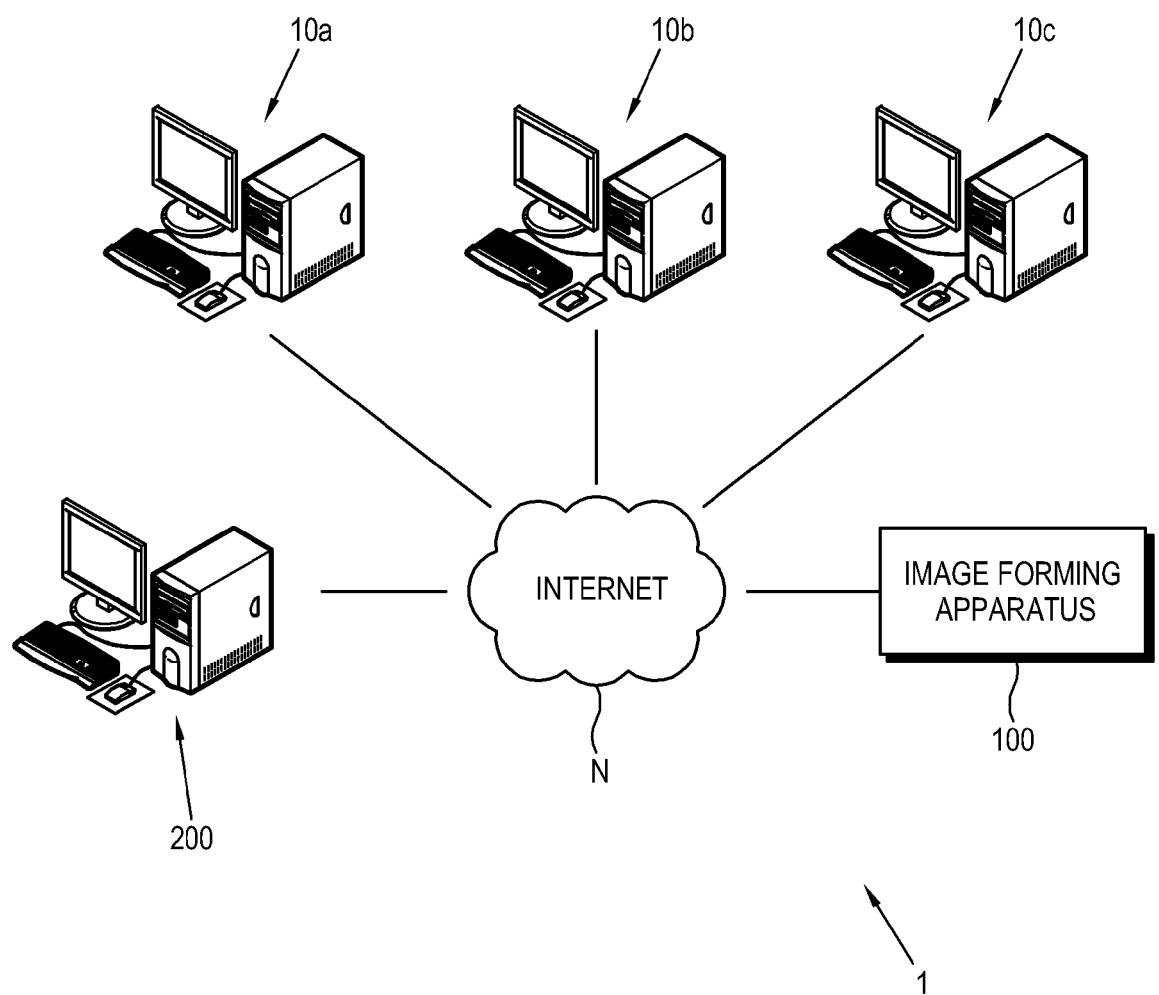
FIG. 1 is a schematic view illustrating an image forming system according to an exemplary embodiment of the present general inventive concept.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

Hereinafter, an image forming apparatus, a host client, an image forming system and a managing method thereof according to desirable exemplary embodiments of the present general inventive concept will be described in detail by referring to the accompanying drawings.

As illustrated in FIG. 1, an image forming system 1 according to an exemplary embodiment of the present general inventive concept includes an image forming apparatus 100 and host clients 10a, 10b, 10c . . . connected to an Internet N, and a managing server 200 managing the image forming apparatus 100. Internet N may be a local area network (LAN), wide area network (WAN), intranet, the Internet, or any other suitable computer communication network. The managing server 200 may be omitted. Also, the number of the host clients 10a, 10b, 10c . . . may be different from FIG. 1, and it is sufficient if the number thereof is more than one.

Figure 2:
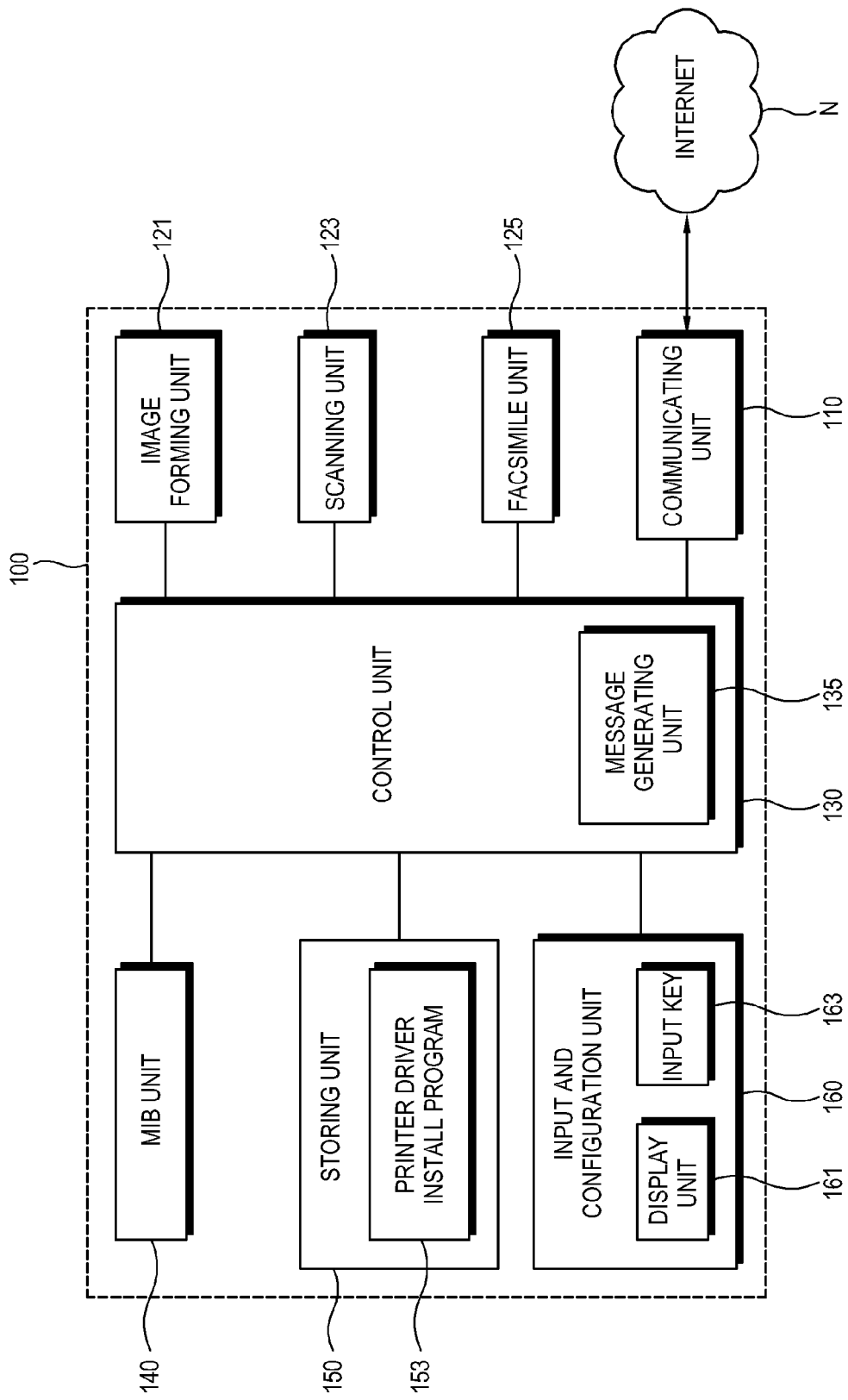
FIG. 2 is a schematic block diagram illustrating an image forming apparatus of the image forming system illustrated in FIG. 1.

As illustrated in FIG. 2, the image forming apparatus 100 according to the present exemplary embodiment includes a communicating unit 110 to communicate with the host clients 10a, 10b, 10c . . . , an image forming unit 121 to form an image on a printing medium and a control unit 130.

The communicating unit 110 may include at least one of a network interface card (NIC), a parallel port and a universal serial bus (USB) port to communicatively connect the image forming apparatus 100 to the internet N.

The image forming unit 121 may employ at least one of an ink jet type jetting an ink to form an image, a laser type fusing a toner on a printing medium to print, and a heat transfer type using a thermal head. Alternatively, the image forming unit 121 may employ other known image forming types.

The control unit 130 may determine to change a control program corresponding to the image forming unit 121, and the control unit 130 may control the communicating unit 110 to transmit information about a change matter of the control program to the host clients 10a, 10b, 10c . . . .

Here, the change matter of the control program includes at least one of installing, uninstalling and upgrading of a printer driver corresponding to the image forming unit 121, and an upgrading of a firmware installed in a read only memory (ROM) or similar memory device of the image forming apparatus 100. In particular, the control unit 130 may control the communicating unit 110 to transmit information about the installing, uninstalling and upgrading of the printer driver, and the upgrading of the firmware of the image forming apparatus 100 to the host clients 10a, 10b, 10c . . . .

If the control unit 130 determines to change the control program corresponding to the image forming unit 121, this may be a case that at least one of an internet protocol (IP) address and a gateway of the image forming apparatus 100 and the host clients 10a, 10b, 10c . . . is changed, or may be a case that a manager of the image forming apparatus 100 inputs a change matter of the control program through an input and configuration unit 160.

As illustrated in FIG. 2, the control unit 130 may include a message generating unit 135 to generate a message having a specific format as information about a change matter of the control program to be transmitted to the host clients 10a, 10b, 10c . . . .

The message generating unit 135 may generate information about the change matter of the control program according to a trap message format of a simple network management protocol (SNMP) or any other suitable message format or network communications protocol.

The SNMP is a representative network managing protocol, and is a managing framework for an Internet allowing a hardware (a router, a bridge, a hub, an Ethernet switch, a modem, etc.) connected to a network such as an Internet/intranet, etc. and a software (an operating system, a network layer, an application program, etc.) to supply a state through a management information base (MIB).

Also, the SNMP defines messages which include, for example, getrequest, getnextrequest, setrequest, getresponse and trap so that a manager and an agent can transmit and receive the messages with each other. Here, the trap message is a message by which the agent informs the manager of a trouble occurrence, and defines basic six trap messages of a link-down, a link-up, an authentication failure, a loss of EGP neighbor and a warm start including a cold start trap message transmitted to the manager when the SNMP agent starts, and an enterprise specific trap message transmitted to the manager if a specific situation besides the basic six trap messages is caused.

A variable for specific situations (error situation) may be defined for transmitting information about the change matter of the control program to the host clients 10a, 10b, 10c . . . as the enterprise specific trap message. That is, the installing, uninstalling and upgrading of the printer driver, and the upgrading of the firmware of the image forming apparatus 100 may be respectively defined as Driver_Install_Trap, Driver_Uninstall_Trap, Driver_Upgrade_Trap and Firmware_Trap.

Also, an object identifier (OID) corresponding to the variables defined above one to one is allocated to a public area or a private area of the MIB.

For example, variables related to the four error situations defined above may be allocated to the OID like the following table 1.

TABLE 1

| error situation (variable name) | OID |
|---|---|
| printer driver install (Driver_Install) | 1.3.6.1.4.1.236.11.5.1.2.1.21.0 |
| printer driver uninstall (Driver_Uninstall) | 1.3.6.1.4.1.236.11.5.1.2.1.11.0 |
| printer driver upgrade (Driver_Upgrade) | 1.3.6.1.4.1.236.11.5.1.2.1.31.0 |
| firmware upgrade (Firmware_Upgrade) | 1.3.6.1.4.1.236.11.5.1.2.1.41.0 |

Accordingly, the image forming apparatus 100 may further include an MIB unit 140 including an OID respectively corresponding to the change matter of the control program, as the information about the change matter of the control program is transmitted to the host clients 10a, 10b, 10c . . . by using the trap command of the SNMP. Alternatively, the MIB may be unnecessary if the information is transmitted through other known protocols or message formats.

The control unit 130 makes the communicating unit 110 transmit the information about the change matter of the control program of the SNMP trap message format generated by means of the message generating unit 135 to the host clients 10a, 10b, 10c . . . .

Also, the control unit 130 may totally control the image forming apparatus 100, and may control the image forming unit 121 to form an image corresponding to a printing data on a printing medium if the communicating unit 110 receives the printing data.

Also, the image forming apparatus 100 may further include the input and configuration unit 160 for inputting a change matter of the control program to be transmitted to the host clients 10a, 10b, 10c . . . .

As illustrated in FIG. 2, the input and configuration unit 160 includes a display unit 161 such as a liquid crystal display (LCD) panel, and an input key 163 for inputting a number, a character, etc.

For example, a manager of the image forming apparatus 100 may input the installing, uninstalling and upgrading of the printer driver, and the upgrading of the firmware of the image forming apparatus 100 in a setting menu displayed in the display unit 161 through the input key 163. In particular, the manager may select yes or no by means of the input key 163 in the setting menu displayed as '[driver uninstall?: yes, no]', '[driver install?: yes, no]', '[driver upgrade?: yes, no]' and '[firmware upgrade?: yes, no]', thereby inputting a change matter of the control program to be informed to a user of the host clients 10a, 10b, 10c . . . .

In the above example, if the manager select 'yes' in the setting menu which is '[driver uninstall?: yes, no]' displayed in the display unit 161, the message generating unit 135 generates a trap message including the OID of '1.3.6.1.4.1.236.11.5.1.2.11.0' allocated as 'printer driver uninstall' in the table 1, and the generated trap message is transmitted to the host clients 10a, 10b, 10c . . . through the communicating unit 110. Here, the generated trap message may be transmitted to the host clients 10a, 10b, 10c . . .

according to at least one packet transmitting type of a multi-casting, a unicasting and a broadcasting.

The image forming apparatus 100 may further include a storing unit 150 to store a printer driver installing program 153. Accordingly, if a change matter of the control program corresponds to the printer driver installing, at least one of the host clients 10a, 10b, 10c . . . receives the change matter, and then directly executes the printer driver installing program stored in the storing unit 150 to install the printer driver to the host client itself.

The image forming apparatus 100 may further include at least one of a scanning unit 123 and a facsimile unit 125.

The scanning unit 123 may include a CCD (Charge Coupled Device) sensor or a CIS (Contact Image Sensor) and scans an image recorded in a document, and the facsimile unit 125 converts the scanned image into an electric signal, which is transmitted via a communicating line.

Figure 3:
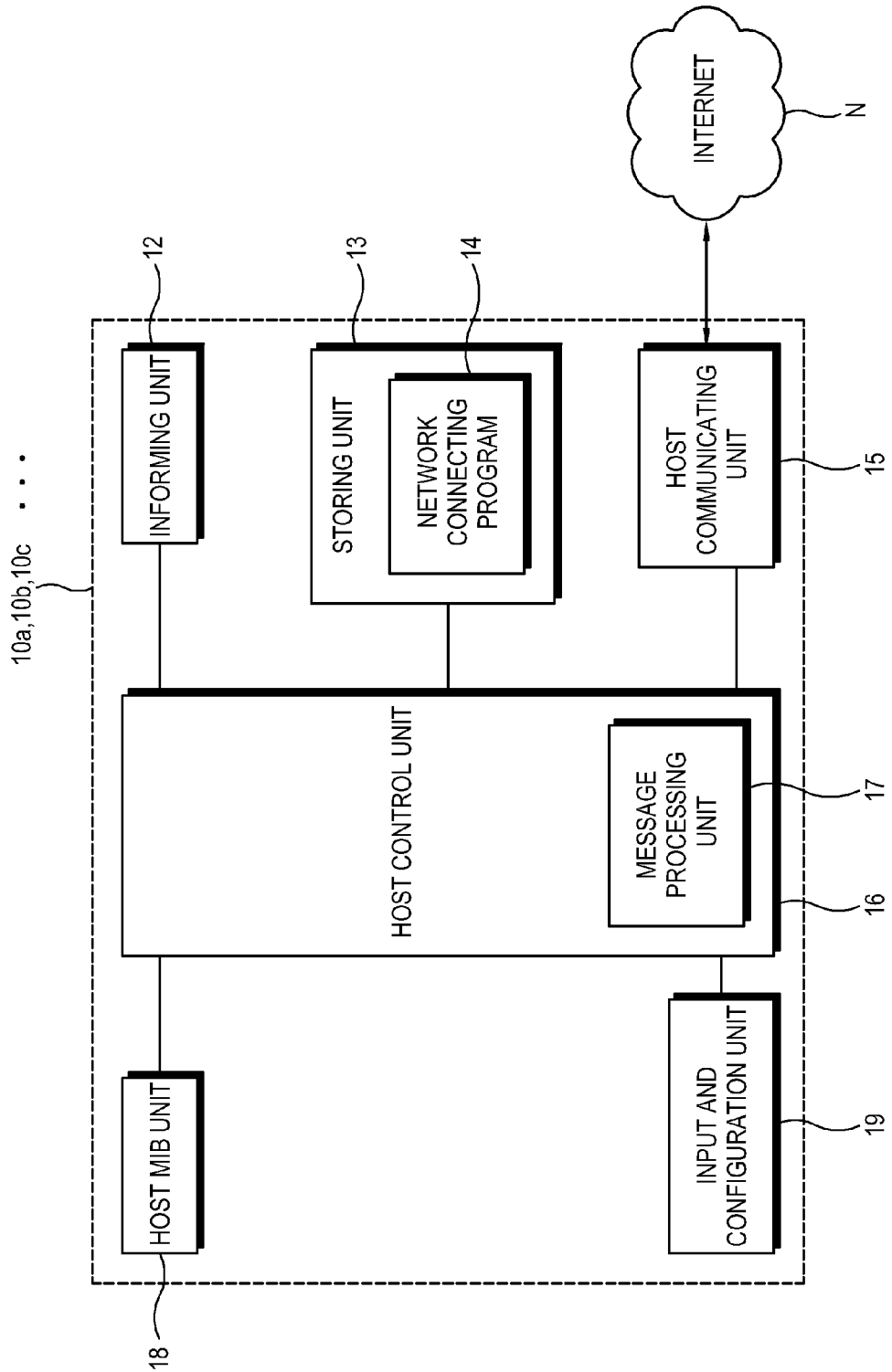
FIG. 3 is a schematic block diagram illustrating a host client of the image forming system in FIG. 1.

As illustrated in FIG. 3, the host clients 10a, 10b, 10c . . . of the image forming system 1 according to the present exemplary embodiment may further include an informing unit 12 to inform the change matter of the control program transmitted from the image forming apparatus 100 of a user. The informing unit 12 may include at least one of a display unit which visually displays the change matter of the control program, a voice outputting unit (not illustrated) outputting the change matter in a voice, and an e-mail transmitting unit (not illustrated) transmitting the change matter to an e-mail address or a mobile device of a user of the host clients 10a, 10b, 10c . . . .

An informing unit 12 may inform (e.g., by display, voice, e-mail, etc.) that the change matter is received, or may inform by questioning to a user of the host clients 10a, 10b, 10c . . . whether to execute a recommended change matter.

The display unit (not illustrated) may include a display apparatus such as a monitor, and the voice outputting unit may include a speaker. The e-mail transmitting unit may be provided to transmit a specific message to a predetermined user e-mail or portable phone number.

For example, if information received through a host communicating unit 15 is 'printer driver install' among the change matter of the control program, a host control unit 16 may control the display unit to display a UI questioning whether to install the printer driver or not. As necessary, the question may be outputted in a voice, or be transmitted to the user e-mail or portable phone.

The host communicating unit 15 may include a network interface card to be communicably connected with the image forming apparatus 100 through the Internet N. The host communicating unit 15 may include at least one of a USB port and a parallel port besides the network interface card. The host communicating unit 15 may receive information about a change matter of the control program from the image forming apparatus 100 and/or the managing server 200 of the image forming apparatus 100.

As illustrated in FIG. 3, the host control unit 16 includes a message processing unit 17 processing information about the change matter of the control program received through the host communicating unit 15.

Also, the host clients 10a, 10b, 10c . . . further include a host MIB unit 18 having the same management information base (MIB) as the MIB unit 140 of the image forming apparatus 100. In brief, the image forming apparatus 100 corresponds to an SNMP agent, and the host clients 10a, 10b, 10c . . . correspond to an SNMP manager to which the SNMP agent reports an error situation.

If the transmitted information is generated by the message generating unit 135 of the image forming apparatus 100 to be the SNMP trap message format, the message processing unit 17 compares the OID included in the transmitted SNMP trap message with the host MIB unit 18 to determine which of the predetermined change matters the transmitted trap message corresponds to.

For example, if the transmitted information (i.e., the OID included in a data packet) is '1.3.6.1.4.1.236.11.5.1.2.1.11.0', and since the OID is allocated as 'printer driver uninstall (Driver_Uninstall)' in the host MIB unit 18, the trap message received therefrom may be determined to correspond to 'printer driver uninstall'.

The message processing unit 17 may determine which of the change matters of the control program the transmitted information corresponds to in this way, and perform the following work depending on the determining result. Here, the message processing unit 17 may control the informing unit 12 to perform a work informing the change matter of the control program. Also, the following work may be performed only after a user approves that the change matter of the control program is to be performed through the input and configuration unit 19, or may be automatically performed as determined.

If the information received through the host communicating unit 15 is related to at least one of the change matter of the control program of 'printer driver install' and 'printer driver upgrade', the message processing unit 17 controls a network connecting program stored in the storing unit 13 to connect to a predetermined download site of the printer driver. Accordingly, a user of the host clients 10a, 10b, 10c . . . may download the printer driver from a corresponding site, and install the driver. The message processing unit 17 may execute a printer driver installing program stored in the storing unit 150 of the image forming apparatus 100 to enable the printer driver of the storing unit 13 to be installed instead of connecting to the download site.

If the information received through the host communicating unit 15 is related to the change matter of the control program which is 'printer driver uninstall', the message processing unit 17 calls an uninstall parameter, and executes a printer driver installing program previously installed to uninstall the printer driver from the host clients 10a, 10b, 10c . . . . For example, if an installing file of the printer driver installing program is 'setup.exe', 'setup.exe/U (here, 'U' is an uninstall parameter) is executed. Instead of the installing file of the printer driver installing program, a separate application program may be sufficient as long as it is capable of uninstalling the printer driver. Here, if the received information is 'printer driver uninstall', the message processing unit 17 may determine whether the printer driver is stored in the storing unit 13 before executing the installing file of the printer driver installing program.

If the information received through the host communicating unit 15 is related to the change matter of the control program which is the 'firmware upgrade' of the image forming apparatus 100, the message processing unit 17 may control the informing unit 12 to inform a user to input whether to perform 'firmware upgrade' and a performing time thereof. It is preferable, but not necessary, to display in a UI through the display unit. If the user inputs according to the informing result, the input result thereof may be transmitted to the image forming apparatus 100 back.

If the image forming apparatus 100 receives the input result allowing the firmware upgrading from the user of the host clients 10a, 10b, 10c . . . , a firmware download site previously determined may be directly connected, and the newest firmware program may be downloaded. For this, it is preferable, but not necessary, that a network connecting program (not illustrated) connecting to a corresponding site with an FTP (File Transfer Protocol) or an HTTP (Hyper Text Transfer Protocol) is stored in the storing unit 150 of the image forming apparatus 100. The control unit 130 of the image forming apparatus 100 compares a firmware upgrading time inputted from the user, and executes the downloaded newest firmware program in the last time to perform the firmware upgrading. Since time to print is different for each user if there are a plurality of host clients 10a, 10b, 10c . . . , and printing capability is reduced, if not impossible, during the firmware upgrading, the firmware upgrading is preferably, but not necessarily, performed in the last time with a consideration of a printing convenience. As necessary, if the host clients 10a, 10b, 10c . . . are provided in plural, and if an input result rejecting executing the firmware upgrading is received to the communicating unit 110 from any one of the host clients 10a, 10b, 10c . . . , the control unit 130 of the image forming apparatus 100 may not perform the firmware upgrading.

If the informing unit 12 is provided to inform by questioning to a user of the host clients 10a, 10b, 10c . . . whether to want a change of the control program to be executed depending on the received change matter or not, the host clients 10a, 10b, 10c . . . may further include the input and configuration unit 19 for receiving a user input response to the question.

The input and configuration unit 19 may include a keyboard, a mouse and other known inputting means.

Figure 4:
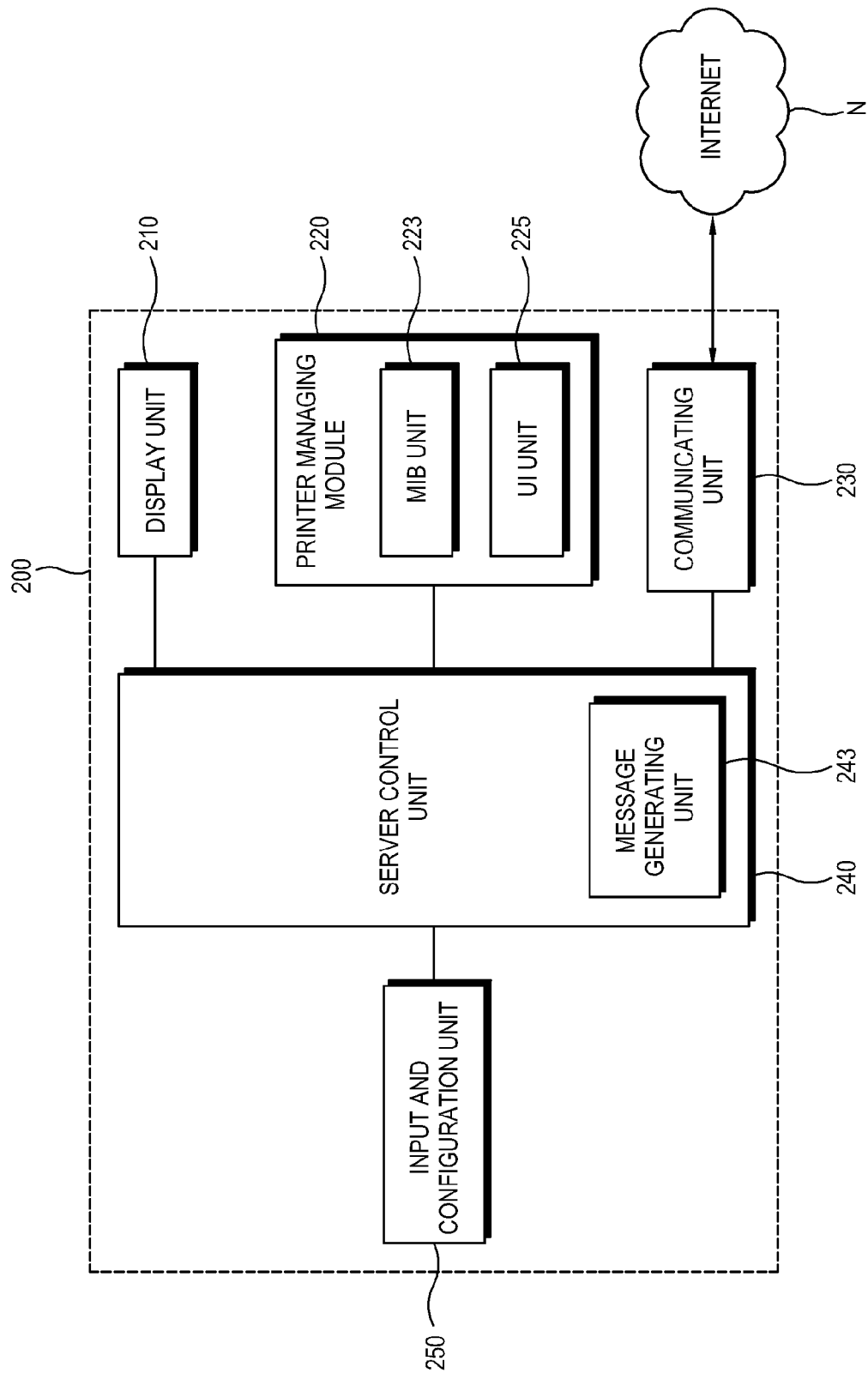
FIG. 4 is a schematic block diagram illustrating a managing server of an image forming apparatus of the image forming system in FIG. 1.
Figure 7:
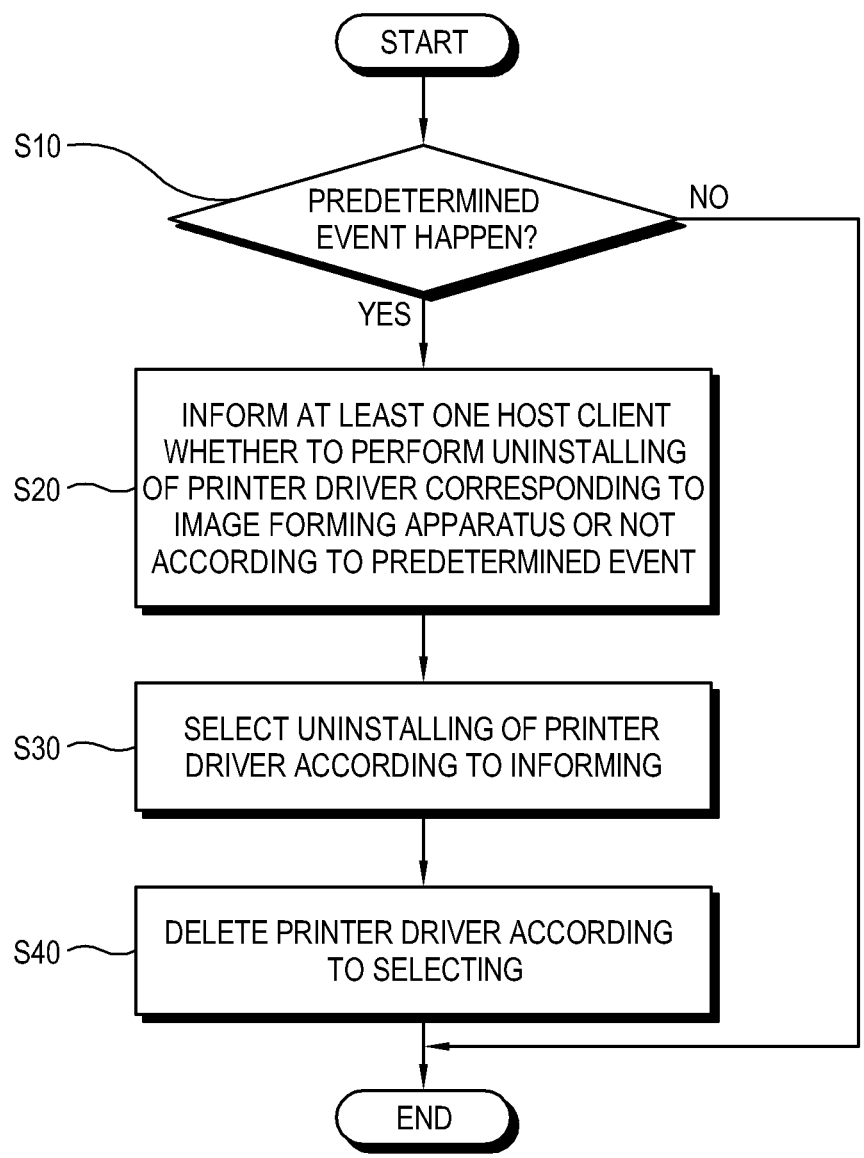
FIG. 7 is a flowchart illustrating a managing method of an image forming system according to a first exemplary embodiment of the present general inventive concept.

As illustrated in FIGS. 1 and 4, the managing server 200 of the image forming apparatus 100 includes a server communicating unit 230 connected to the Internet N to communicate with the host clients 10a, 10b, 10c . . . and the image forming apparatus 100, and a server control unit 240.

In the above, the control unit 130 of the image forming apparatus 100 transmits the information about the change matter of the control program to the host clients 10a, 10b, 10c . . . . Alternatively, the server control unit 240 may perform this function instead of the control unit 130 of the image forming apparatus 100, or together therewith.

More in detail, as illustrated in FIG. 4, the server control unit 240 controls the server communicating unit 230 to transmit information about a change matter of a control program to the host clients 10a, 10b, 10c . . . if a change of the control program corresponding to the image forming apparatus 100 is necessary.

Here, the change matter of the control program includes at least one of installing, uninstalling and upgrading of a printer driver corresponding to the image forming apparatus 100, and an upgrading of a firmware installed in a ROM (not illustrated) or other suitable memory device of the image forming apparatus 100.

Here, the server control unit 240 may include a message generating unit 243 generating a simple network management (SNMP) trap message corresponding to the information about the change matter of the control program. Alternatively, message generating unit 243 may generate a network management message of any other suitable messaging and/or networking protocol that corresponds to the information about the change matter of the control program.

The message generating unit 243 generates information about the change matter of the control program according to a trap message format of the SNMP.

Also, the managing server 200 of the image forming apparatus 100 may further include a printer managing module 220 including an MIB unit 223 including four error situations like the above table 1 and an OID corresponding thereto, and a UI unit 225 supplying a UI for selecting the host clients 10a, 10b, 10c . . . to which the change matter of the control program is informed. Here, the MIB unit 223 may have the same configuration as the MIB unit 140 of the image forming apparatus 100.

A determination to change the control program corresponding to the image forming apparatus 100 may include a case that at least one of an IP address and a gateway of the image forming apparatus 100 and the host clients 10a, 10b, 10c . . . is changed, or a case that a manager of the image forming apparatus 100 inputs the change matter of the control program through the input and configuration unit 160 of the image forming apparatus 100 and an input and configuration unit 250 of the managing server 200.

The input and configuration unit 250 of the managing server 200 may include various known inputting means such as a keyboard, a mouse, etc.

The UI unit 225 may generate an informing target computer list UI 300 and a printer driver automatic change UI 400 respectively illustrated in FIGS. 5 and/or 6. If there is a demand of a manager of the image forming apparatus 100, the server control unit 240 may control the UI unit 225 and the display unit 210 to display the UIs in FIGS. 5 and 6 in the display unit 210.

The manager of the image forming apparatus 100 may determine host clients A, B, C, D, E . . . to which the change matter of the control program is informed among a plurality of host clients A, B, C, D, E . . . through the informing target computer list UI 300 illustrated in FIG. 5. Also, the change matter of the control program informed by each host client A, B, C, D, E . . . may be determined.

For example, as illustrated in FIG. 5, only change matters of the control program which are 'printer driver install' and 'firmware upgrade' may be informed to a host client 'A', and only a change matter which is 'driver uninstall' may be informed to a host client 'C'.

If an informing target host client is selected through the informing target computer list UI 300 and the input and configuration unit 250, the server control unit 240 may, for example, control the communicating unit 230 so that change matter of the control program is informed to only the selected host client.

Also, the manager of the image forming apparatus 100 may determine a host client A, B, C, D, E . . . , a printer driver of which is automatically changed by using the printer driver automatic change UI 400 illustrated in FIG. 6. For example, host clients 'A' and 'B' may be determined to install the printer driver, host clients 'C' and 'D' may be determined to uninstall the printer driver, and a host clients 'E' may be determined to upgrade the printer driver. If these determining results are inputted through the input and configuration unit 250, the server control unit 240 controls the communicating unit 230 so that the determined information about the change matter of the control program can be transmitted to each host client. In this case, for the automatic change of the printer driver, the message processing units 17 in FIG. 3 of the host clients A, B, C, D, E . . . may be provided to automatically change the printer driver depending on the transmitted change matter.

In the above, the trap message of the SNMP is used for informing each host client whether to delete the printer driver or not. However, the present general inventive concept is not defined thereto, and alternatively, other known protocols may be used thereto.

Hereinafter, a managing method of an image forming system including an image forming apparatus and a host client connected to the image forming apparatus according to an exemplary embodiment of the present general inventive concept will be describe by referring to FIGS. 1 and 7-10 in detail.

A managing method of an image forming system according to a first exemplary embodiment of the present general inventive concept is as follows. It is determined whether an event of an image forming apparatus 100 previously determined happens or not at block S10.

Here, the previously determined event means that it is impossible to use the image forming apparatus 100 to print like a case that an installation place of the image forming apparatus 100 is changed (for example, the image forming apparatus is moved to another building, or to another layer in the same building), a case that the image forming apparatus 100 is out of order to need an after service, or a case that the image forming apparatus 100 falls into disuse. This print impossible situation, or, alternative, reduction in printing capacity situation, may be automatically determined if a specific condition is satisfied. For example, if a gateway of the image forming apparatus 100 is changed, it means that the installation place of the image forming apparatus 100 is changed, and it may be determined as the print impossible situation, thereby determining that the event happens. Also, if 'print impossible fact' is manually inputted through the input and configuration unit 160 from a manager of the image forming apparatus 100, the previously determined event may be determined to happen.

Here, the previously determined event may be stored in a memory (not illustrated) inside the image forming apparatus 100, or may be stored in a look up table (LUT).

At block S20, at least one host client 10a, 10b, 10c . . . is informed whether to perform the uninstalling of the printing driver corresponding to the image forming apparatus 100 according to the previously determined event or not.

The host clients 10a, 10b, 10c . . . select the uninstalling of the printer driver according to the informing (block S30), and the printer driver is deleted from the host clients 10a, 10b, 10c . . . according to the selecting (block S40). The selecting may be performed through the input and configuration unit 19 provided to the host clients 10a, 10b, 10c . . . .

Figure 8B:
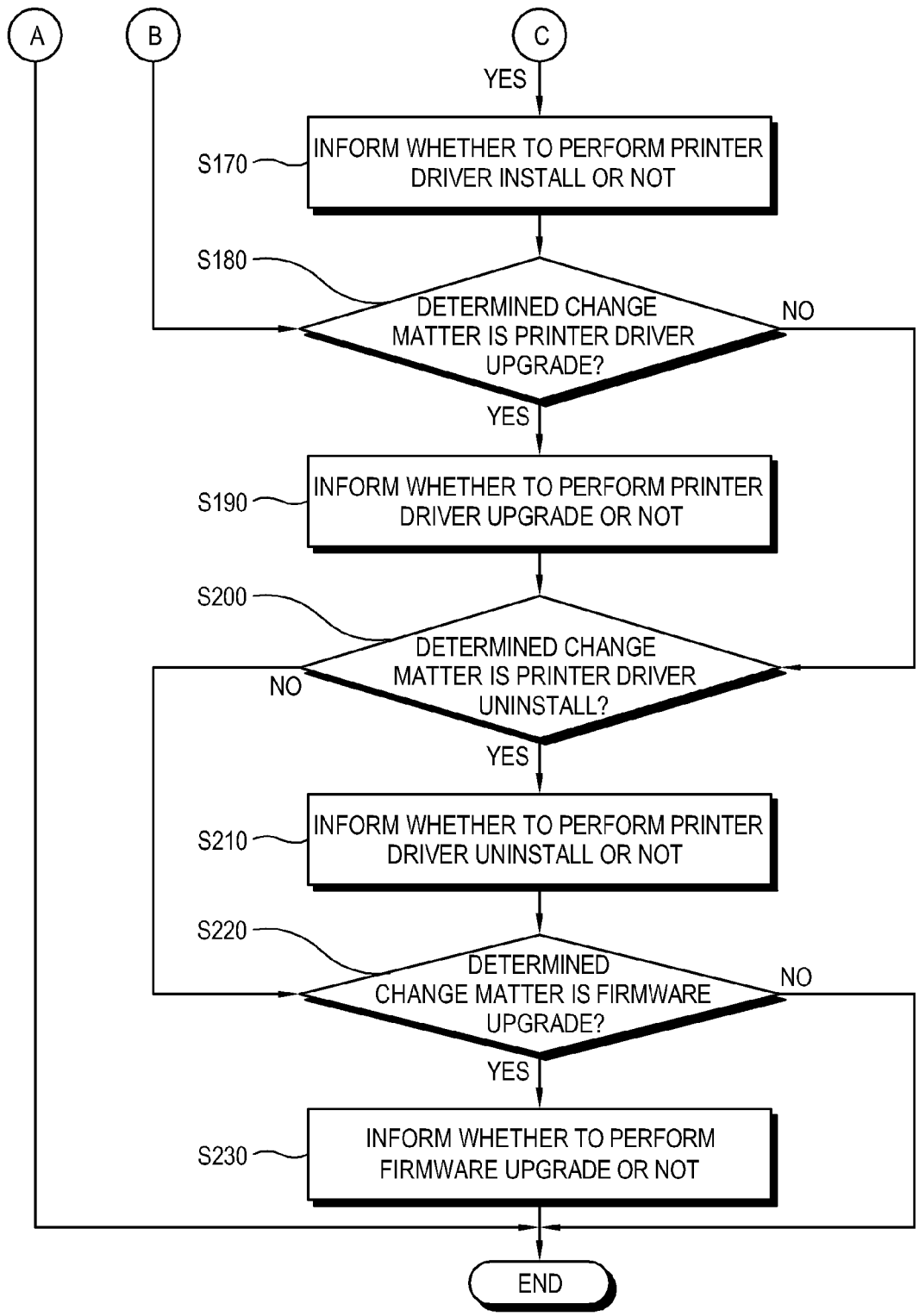
Figure 9A:
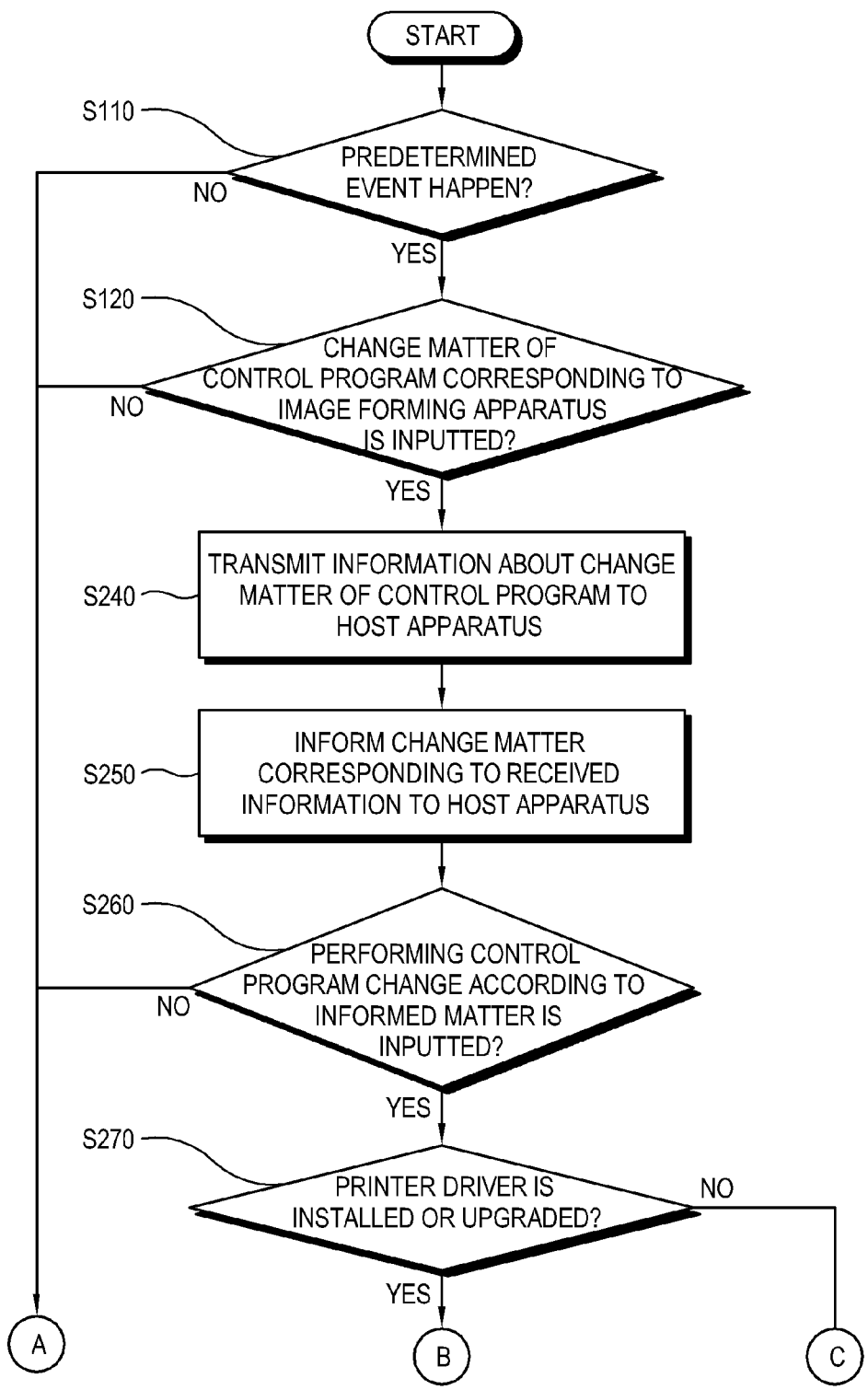
FIGS. 9A and 9B are flowcharts illustrating a managing method of an image forming system according to a third exemplary embodiment of the present general inventive concept.
Figure 9B:
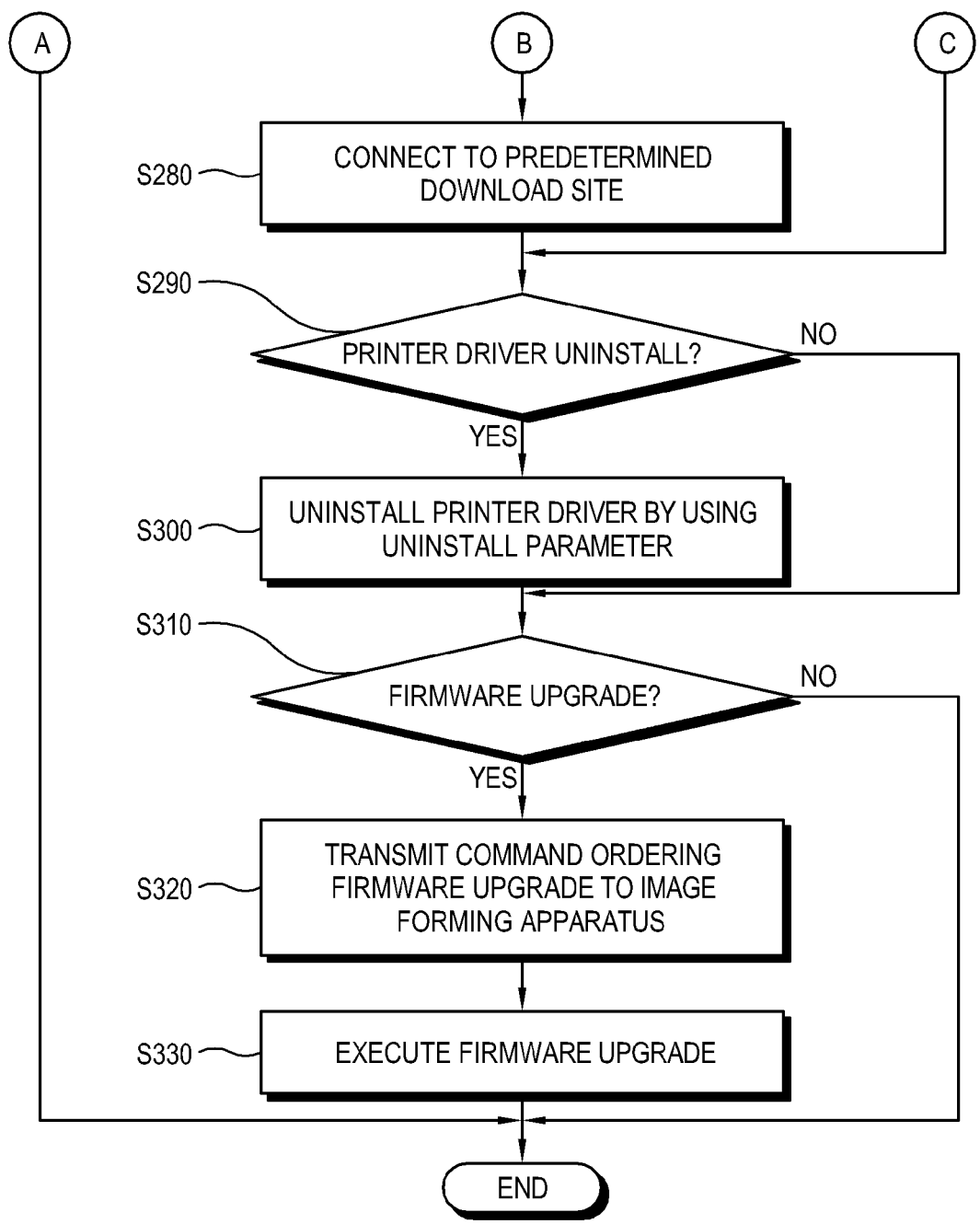

As illustrated in FIGS. 8A and 8B, a managing method of an image forming system according to a second exemplary embodiment of the present general inventive concept determines whether a previously determined event of an image forming apparatus 100 happens or not (block S110). Also, If the previously determined event happens (YES of block S110), it is determined whether there is an input about a change matter of a control program corresponding to the image forming apparatus 100 or not (block S120). The operation at block S120 includes a case that the change matter is inputted by means of a manager of the image forming apparatus 100.

Here, the change matter of the control program includes at least one of installing, uninstalling and upgrading of a printer driver corresponding to an image forming unit 121, and an upgrading of a firmware installed in an ROM (not illustrated) of the image forming apparatus 100.

If it corresponds to the above two operations S110 and S120, an MIB including at least one OID corresponding to the change matter is respectively provided to the image forming apparatus 100 and a host client 10a, 10b, 10c . . . (block S130). Since the MIB transmits information about the change matter in a trap message format of an SNMP, the MIB may be unnecessary and the operation at block S130 may be omitted if it is transmitted in other known protocols or message formats instead of the trap message of the SNMP.

At block S140, the trap message of the SNMP including the OID corresponding to the change matter is transmitted to the host client 10a, 10b, 10c . . . .

The host client 10a, 10b, 10c . . . compares the OID included to the received trap message with the MIB to determine what the change matter is (block S150).

If the determined change matter is the installing of the printer driver (block S160), it is informed whether to perform an installing work of the printer driver or not (block S170).

If the determined change matter is the upgrading of the printer driver (block S180), a user of the host client 10a, 10b, 10c . . . is informed whether to perform an upgrading work of the printer driver or not (block S190).

If the determined change matter is the uninstalling of the printer driver (block S200), user of the host client 10a, 10b, 10c . . . is informed whether to perform an uninstalling work of the printer driver or not (block S210).

If the determined change matter is the upgrading of the firmware (block S220), the user of the host client 10a, 10b, 10c . . . is informed whether to perform an upgrading work of the firmware or not (block S230). Accordingly, the user of the host client 10a, 10b, 10c . . . may be informed of the change matter of the control program. Especially, if a plurality of host clients 10a, 10b, 10c . . . use the image forming apparatus 100, the manager of the image forming apparatus 100 may efficiently inform each user of the change matter of the control program.

As illustrated in FIGS. 1, 3, 9A and 9B, a managing method of an image forming system 1 according to a third exemplary embodiment of the present general inventive concept is described. At block S110, it is determined whether a previously determined event of an image forming apparatus 100 happens or not. Here, the previously determined event may be the same as the above.

If the previously determined event happens, it is determined whether there is an input about a change matter of a control program corresponding to the image forming apparatus 100 or not (block S120). The operation at block S120 includes a case that the change matter is manually inputted by means of a manager of the image forming apparatus 100. Also, the order of the operations at blocks S110 and S120 may be changed.

If there is the input about the change matter (YES of block S120), information about the change matter of the control program is transmitted to a host client 10a, 10b, 10c . . . (block S240). The information may be transmitted to the host client 10a, 10b, 10c . . . by the image forming apparatus 100 or a managing server 200 in FIG. 4 managing the image forming apparatus 100.

At block S250, the change matter corresponding to the transmitted information is informed to the host client 10a, 10b, 10c . . . .

At block S260, it is determined whether there is an input for performing a change work of the control program according to the change matter to correspond to the informing result or not.

If it is inputted to perform the change work of the control program (YES of block S260), and if the change matter corresponds to an installing or an upgrading of a printer driver (YES of block S270), a predetermined download site is connected to (block S280). The newest printer driver program is downloaded from the site, and an installing file of the downloaded program is executed to install or upgrade the printer driver in the host client 10a, 10b, 10c . . . . If the image forming apparatus 100 has a storing unit 150 storing the installing program of the printer driver, the installing or upgrading of the printer driver may be performed by connecting to the storing unit 150 and executing the installing file of the installing program.

If the change matter corresponds to an uninstalling of the printer driver (YES of block S290), the printer driver is uninstalled from the host client 10a, 10b, 10c . . . by using an uninstall parameter to perform a previously installed printer driver installing program (block S300). Here, the printer driver may be uninstalled by means of other application programs instead of the previously installed printer driver installing program. This program uninstalling the printer driver from the host client 10a, 10b, 10c . . . may be commonly named as a deleting program of the printer driver.

Here, determining whether the printer driver is installed to the host client 10a, 10b, 10c . . . or not may be provided between the operations at blocks S290 and S300, and the operation at block S300 may be performed if the printer driver is determined to be installed.

If the change matter corresponds to an upgrading of a firmware of the image forming apparatus 100 (YES of block S310), a command ordering the upgrading of the firmware is transmitted to the image forming apparatus 100 (block S320).

The image forming apparatus 100 executes the upgrading of the firmware depending on the transmitted firmware upgrading command (block S330). The image forming apparatus 100 may connect to a predetermined firmware download site to download the newest firmware, and execute this to perform the upgrading of the firmware.

Figure 10:
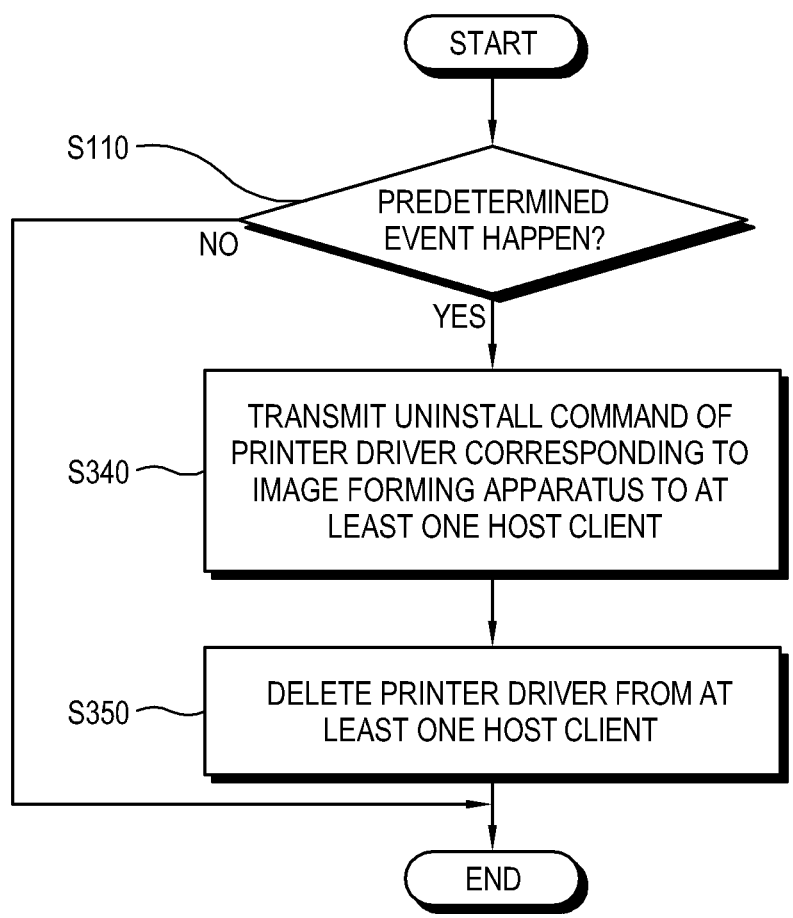
FIG. 10 is a flowchart illustrating a managing method of an image forming system according to a fourth exemplary embodiment of the present general inventive concept.

As illustrated in FIGS. 1 and 10, a managing method of an image forming system 1 according to a fourth exemplary embodiment of the present general inventive concept determines whether a previously determined event of an image forming apparatus 100 happens or not (block S110).

At block S340, if the previously determined event happens, an uninstalling command of a printer driver corresponding to the image forming apparatus 100 is transmitted to at least one host client 10a, 10b, 10c . . . .

At block S350, the printer driver is deleted from at least one host client 10a, 10b, 10c . . . . Accordingly, the printer driver corresponding to the image forming apparatus 100 which is not capable of printing any more may be automatically deleted from the host client 10a, 10b, 10c . . . , thereby efficiently managing the image forming system 1.

Especially, if the printer driver installed in the existing host client 10a, 10b, 10c . . . is unnecessary, resource allocation and management of each host client 10a, 10b, 10c . . . may be efficiently performed by automatically uninstalling the printer driver.

Also, the uninstalling work of the printer driver is automatically performed without intervention of a user of the host client 10a, 10b, 10c . . . , thereby improving a user convenience.

In the above, the printer driver and the firmware are exemplarily described as a control program corresponding to the image forming apparatus 100. However, the present general inventive concept is not defined thereto, and the present general inventive concept may be employed for managing various control programs.

An image forming apparatus, a host client, an image forming system and a managing method thereof as described above have the following effects.

First, a control program corresponding to the image forming apparatus may be efficiently managed.

Second, a user of the host client may be informed of a change of a control program of the image forming apparatus. Accordingly, a print error which is caused by using a control program, especially, a printer driver which is unavailable for a printing work may be prevented previously.

Third, a control program of the image forming apparatus is automatically changed, thereby improving a user convenience.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A managing method of an image forming system which comprises an image forming apparatus to print an image on a print medium, and a host client connected to the image forming apparatus, the managing method of the image forming system comprising:
    determining whether a predetermined event of the image forming apparatus happens;
    when the predetermined event happens, determining whether a change matter of a control program corresponding to the image forming apparatus has occurred and determining a type of the change matter from a group including at least an installing, an uninstalling, and an upgrading of a printer driver, and an upgrading of a firmware installed in the image forming apparatus,
    informing pre-selected host clients among a plurality of host clients whether to perform at least one of the installing, the uninstalling, and the upgrading of the printer driver which corresponds to the image forming apparatus, and the upgrading of a firmware installed in the image forming apparatus depending on the occurred change matter based on an informing target computer list;
    selecting at least one of the installing the uninstalling, and the upgrading of the printer driver, and the upgrading of the firmware installed in the image forming apparatus depending on the informing; and
    performing at least one of the installing, the uninstalling, and the upgrading of the printer driver, and the upgrading of the firmware installed in the image forming apparatus from the host client depending on the selecting.

2. The managing method of the image forming system according to claim 1, wherein the predetermined event is stored in a memory of the image forming apparatus.

3. The managing method of the image forming system according to claim 1, wherein the informing comprises:

questioning to a user whether to delete the printer driver from the host client.

4. The managing method of the image forming system according to claim 1, further comprising:
inputting directly an uninstalling command of the printer driver to the image forming apparatus,
wherein the informing comprises informing at least one host client whether to uninstall the printer driver depending on the inputting.

5. The managing method of the image forming system according to claim 1, wherein the deleting the printer driver comprises:
executing a deleting program of the printer driver which is previously installed with an uninstall parameter.

6. The managing method of the image forming system according to claim 1, wherein canceling of the uninstalling of the printer driver is allowed to be selected to correspond to a result of the informing.

7. The managing method of the image forming system according to claim 1, wherein the informing comprises:
transmitting the uninstalling command of the printer driver to the host client according to a trap message format of a simple network management protocol (SNMP).

8. The managing method of the image forming system according to claim 1, wherein the informing is performed by at least one of displaying and voice outputting to the host client.

9. The managing method of the image forming system according to claim 1, wherein the event is displayed in the image forming apparatus if the predetermined event happens.

10. A host client, comprising:
a host communicating unit to communicate with an image forming apparatus;
an informing unit;
an input and configuration unit; and
a host control unit to control the informing unit to inform whether to perform an uninstalling of a printer driver which corresponds to the image forming apparatus when an uninstalling command of the printer driver is received through the host communicating unit from a management server based on an informing target computer list utilized to inform only pre-selected host clients among a plurality of host clients, and to perform or cancel the uninstalling of the printer driver according to an input result inputted through the input and configuration unit to correspond to the informing result,
wherein the uninstalling command is received depending on an occurring of a change matter of a control program, the change matter being determined from a group including at least an installing, an uninstalling, and an upgrading of the printer driver, and the upgrading of a firmware installed in the image forming apparatus, and
wherein the host control unit controls the informing unit to further inform whether to perform at least one of the installing, the uninstalling, and the upgrading of the printer driver, and the upgrading of a firmware installed in the image forming apparatus.

11. The host client according to claim 10, wherein the informing unit comprises:
at least one of a display unit to visually display and a voice outputting unit to audibly output whether to perform the uninstalling of the printer driver.

12. The host client according to claim 10, wherein the host control unit deletes the printer driver from the host client by using an uninstall parameter to execute a deleting program of the printer driver which is previously installed.

13. An image forming system, comprising:
an image forming apparatus;
at least one host client communicatively connected with the image forming apparatus to print through the image forming apparatus; and
a managing server to determine whether a change matter of a control program corresponding to the image forming apparatus has occurred and what the occurred change matter is when a predetermined event of the image forming apparatus happens, a type of the change matter being determined from a group including at least an installing, an uninstalling, and an upgrading of a printer driver, and an upgrading of a firmware installed in the image forming apparatus, and to inform pre-selected host clients among a plurality of host clients whether to perform at least one of the installing, the uninstalling, and the upgrading of the printer driver which corresponds to the image forming apparatus, and the upgrading of a firmware installed in the image forming apparatus, depending on the occurred change matter based on an informing target computer list,
wherein the managing server performs at least one of the installing, the uninstalling, and the upgrading of the printer driver, and the upgrading of the firmware installed in the image forming apparatus depending on the informing and selection of the host client.

* * * * *

UNITED STATES PATENT AND TRADEMARK OFFICE
CERTIFICATE OF CORRECTION

| | |
|---|---|
| PATENT NO. | : 8,941,861 B2 |
| APPLICATION NO. | : 12/491493 |
| DATED | : January 27, 2015 |
| INVENTOR(S) | : Young-ju Kim et al. |

It is certified that error appears in the above-identified patent and that said Letters Patent is hereby corrected as shown below:

Claims

Claim 1, Column 14, Line 55 (Approximately)

Delete "installing" and insert --installing,--, therefor.

Signed and Sealed this
Thirteenth Day of October, 2015

Michelle K. Lee
*Director of the United States Patent and Trademark Office*